(12) United States Patent
Sato

(10) Patent No.: US 8,853,910 B2
(45) Date of Patent: Oct. 7, 2014

(54) THREE-PHASE ROTARY ELECTRICAL MACHINE AND MANUFACTURING METHOD THEREOF

(75) Inventor: Tomohiro Sato, Hove (GB)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 228 days.

(21) Appl. No.: 13/607,141

(22) Filed: Sep. 7, 2012

(65) Prior Publication Data
US 2013/0062972 A1  Mar. 14, 2013

(30) Foreign Application Priority Data

Sep. 9, 2011 (JP) ................................ 2011-196931
Jul. 6, 2012 (JP) ................................ 2012-152077

(51) Int. Cl.
*H02K 1/00* (2006.01)

(52) U.S. Cl.
USPC ............................ 310/194; 310/59; 310/179

(58) Field of Classification Search
USPC ............. 310/59, 179, 184, 194, 198, 216.119
See application file for complete search history.

(56) References Cited

U.S. PATENT DOCUMENTS

| 6,777,835 B1 * | 8/2004 | Sines ................................ 310/64 |
| 6,870,292 B2 * | 3/2005 | Owada et al. ................. 310/194 |
| 7,122,934 B2 * | 10/2006 | Yamamoto et al. ..... 310/216.105 |
| 8,203,240 B2 * | 6/2012 | Hoshino et al. ................. 310/54 |
| 2003/0098630 A1 * | 5/2003 | Owada et al. .................. 310/259 |
| 2005/0057106 A1 * | 3/2005 | Allen et al. ...................... 310/54 |
| 2009/0184591 A1 * | 7/2009 | Hoshino et al. ................. 310/54 |
| 2010/0194214 A1 | 8/2010 | Takahashi et al. |
| 2012/0126643 A1 * | 5/2012 | Zhong ............................ 310/59 |

FOREIGN PATENT DOCUMENTS

| EP | 1 168 571 A2 | 1/2002 |
| JP | 2002-10554 A | 1/2002 |
| JP | 2009-89456 A | 4/2009 |

* cited by examiner

*Primary Examiner* — Thanh Lam
(74) *Attorney, Agent, or Firm* — Sughrue Mion, PLLC

(57) ABSTRACT

A three-phase rotary electrical machine including a stator including a stator core including split cores, a rotor, a bobbin attached to each of the split cores, a winding being wound around each split core to which the bobbin is attached, and a bobbin unit including three of the bobbins which are arranged in a circumferential direction of a rotation axis as one unit, wherein the bobbin positioned at a center of the bobbin unit are formed in a bendable manner integrally with the bobbins positioned adjoining to the bobbin positioned at the center, the bobbin unit is sealed with the bobbin unit positioned adjoining thereto, and a cooling passage extending in the axial direction is provided at each clearance between the windings for three phases.

11 Claims, 10 Drawing Sheets

THREE-PHASE ROTARY ELECTRICAL MACHINE AND MANUFACTURING METHOD THEREOF

CROSS REFERENCE TO RELATED APPLICATIONS

This application is based on and claims priority under 35 U.S.C. §119 to Japanese Patent Application 2011-196931, filed on Sep. 9, 2011, and to Japanese Patent Application 2012-152077, filed on Jul. 6, 2012, the entire contents of which are incorporated herein by reference.

TECHNICAL FIELD

This disclosure relates to a three-phase rotary electrical machine.

BACKGROUND DISCUSSION

A known stator structure is disclosed in JP2009-89456A (hereinafter referred to as Patent reference 1), which aims at improving a performance of cooling a stator coil including split cores. According to the stator structure described in the Patent reference 1, a bus bar is connected to a resin-molded coil end portion, and cooling oil is sprayed at the bus bar for cooling the coil end portion.

However, the stator structure disclosed in the Patent reference 1 is for cooling the bus bar connected to the coil end portion, and thus a local cooling is applied to the coil end portion and an entire stator coil is not sufficiently cooled.

A need thus exists for a three-phase rotary electrical machine which is not susceptible to the drawback mentioned above.

SUMMARY

According to an aspect of this disclosure, a three-phase rotary electrical machine includes a stator including a stator core including split cores split in a circumferential direction of a rotation axis, a rotor arranged coaxially with and facing the stator, a bobbin made of an insulating material and attached to each of the split cores, a winding being wound in a concentrated winding method around each split core to which the bobbin is attached, the winding being provided for each of three phases of the rotary electrical machine, and a bobbin unit including three of the bobbins which are arranged in the circumferential direction as one unit, wherein each bobbin includes inner peripheral side end portions), the inner peripheral side end portions of the bobbin positioned at a center among the three bobbins of the bobbin unit are formed in a bendable manner integrally with the corresponding inner peripheral side portion of each of the bobbins positioned adjoining to the bobbin positioned at the center, the bobbin unit is split in an axial direction of the rotation axis in such a way that the bobbin unit is configured to be attached to three of the split cores from axial ends of the three split cores, and the three of the split cores are attached with the bobbin unit from the axial ends, the bobbin unit is sealed at the corresponding inner peripheral side end portions with the bobbin unit positioned adjoining thereto, and a cooling passage extending in the axial direction is provided at each clearance between the windings for the three phases.

According to a further aspect of this disclosure, a manufacturing method of a three-phase rotary electrical machine, the three-phase rotary electrical machine including a stator including a stator core including split cores split in a circumferential direction of a rotation axis, a rotor arranged coaxially with and facing the stator, a bobbin made of an insulating material and attached to each of the split cores, a winding being wound in a concentrated winding method around each split core to which the bobbin is attached, a bobbin unit including three of the bobbin which are arranged in the circumferential direction as one unit, wherein each bobbin includes inner peripheral side end portions, the inner peripheral side end portions of the bobbin positioned at a center among the three bobbins of the bobbin unit are formed in a bendable manner integrally with the corresponding inner peripheral side portion of each of the bobbins positioned adjoining to the bobbin positioned at the center, and the bobbin unit is split in an axial direction of the rotation axis in such a way that the bobbin unit is configured to be attached to three of the split cores from axial ends of the three split cores, the manufacturing method of the three-phase rotary electrical machine includes an assembly process for attaching the bobbin unit to the three of the split cores from the axial ends of the split core, a winding process for arranging inner peripheral side surfaces of the bobbin unit, which is attached to the three of the split cores, in a triangular configuration when viewed in the axial direction and for winding the winding, and a sealing process for arranging the bobbin unit, around which the winding is wound, along the circumferential direction, and for sealing the bobbin unit and the bobbin unit positioned adjoining thereto with each other at the inner peripheral side end portions.

According to a further aspect of this disclosure, a manufacturing method of a three-phase rotary electrical machine, the three-phase rotary electrical machine including a stator including a stator core including split cores split in a circumferential direction of a rotation axis, a rotor arranged coaxially with and facing the stator, a bobbin made of an insulating material and attached to each of the split cores, a winding being wound in a concentrated winding method around each split core to which the bobbin is attached, a bobbin unit including three of the bobbin which are arranged in the circumferential direction as one unit, wherein each bobbin includes inner peripheral side end portions, each inner peripheral side end portion of each bobbin is formed in a bendable manner integrally with the corresponding inner peripheral side portion of the adjoining bobbins, inner peripheral side surfaces define a triangular configuration when viewed in an axial direction of the rotation axis, and the bobbin unit is split in the axial direction in such a way that the bobbin unit is configured to be attached to three of the split cores from axial ends of the three split cores, the manufacturing method of the three-phase rotary electrical machine including an assembly process for attaching the bobbin unit to the three of the split cores from axial ends of the split core, a winding process for winding the winding around the bobbin unit which is attached to the split cores, a cutting process for cutting one of apices of the triangular configuration after the winding is wound, and a sealing process for arranging the bobbin unit, where the one of the apices of the triangular configuration is cut, along the circumferential direction and for sealing the bobbin unit and the bobbin unit positioned adjoining thereto with each other at the inner peripheral side end portions.

According to a further aspect of this disclosure, a three-phase rotary electrical machine includes a stator including a stator core including split cores split in a circumferential direction of a rotation axis, a rotor arranged coaxially with and facing the stator, and a bobbin made of an insulating material and attached to each of the split cores, a winding being wound in a concentrated winding method around each split core to which the bobbin is attached, the winding being provided for each of three phases of the rotary electrical machine, wherein each bobbin includes inner peripheral side end portions, the bobbin attached to one of the split cores and the bobbin attached to another one of the split cores positioned adjoining to the one of the split cores are sealed with each other at the corresponding inner peripheral side end portions, and a cooling passage extending in an axial direction of the rotation axis is provided at each clearance between the windings for the three phases.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
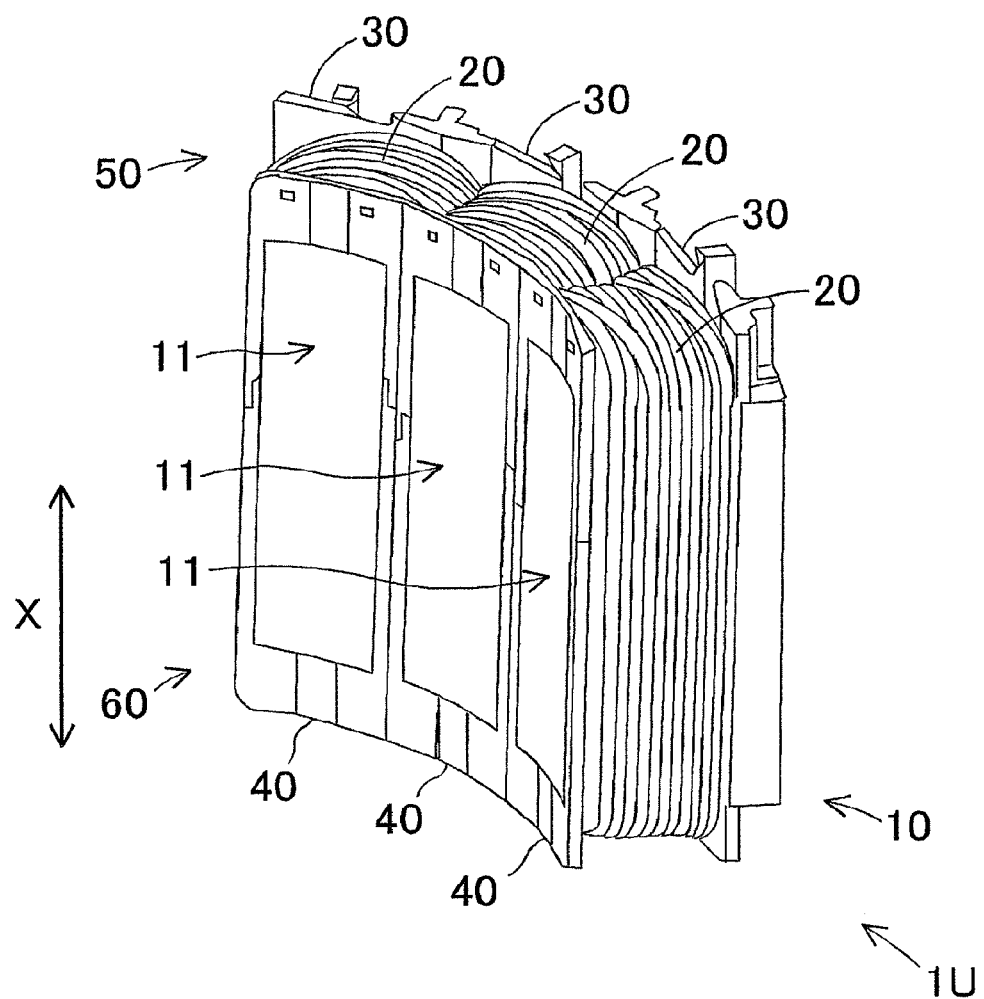
FIG. 1 is a perspective view schematically illustrating a part of a stator of embodiments disclosed here.

First, second and third embodiments related to this disclosure will be explained with reference to the accompanying drawings. In the embodiments, identical reference numerals designate the identical or corresponding portions or parts, and therefore, duplicated description of these portions or parts is omitted. Each of the accompanying drawings schematically illustrates the embodiments, however, the accompanying drawings do not specify sizes of structures in detail.

(1) A structure of the three-phase rotary electrical machine of a first embodiment will be explained hereunder with reference to FIGS. 1 to 3D.

The three-phase rotary electrical machine of the first embodiment is provided with a stator 1, and a rotor 2 which will be explained later (refer to FIG. 8). The stator 1 includes a stator core 10 including split cores 11 in a circumferential direction of a rotation axis X. The rotor 2 is arranged coaxially with the stator 1 to face the stator 1. A winding 20, that is, a three-phase winding, is wound around the split core 11 in a concentrated winding method. In FIG. 1, three of the split cores 11, 11, 11 are illustrated for convenience of the explanation. According to the three-phase rotary electrical machine of the embodiments disclosed here, the three split cores 11, 11, 11, which constitute three phases respectively, correspond to one unit and are arranged in the circumferential direction of the rotation axis X for forming an annular shape. In the embodiments, the stator, which is constituted by the split cores 11, 11, 11 corresponding to the one unit, is referred to as a stator unit 1U as illustrated in FIG. 1.

Figure 2A:
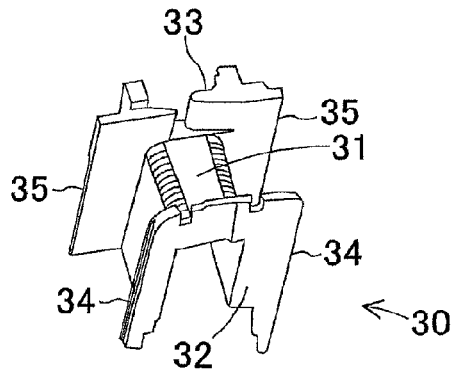
FIG. 2A is a perspective view schematically illustrating a structure of a first bobbin of the embodiments.
Figure 2B:
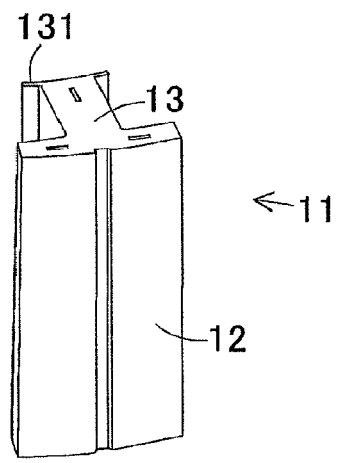
FIG. 2B is a perspective view schematically illustrating a split core of the embodiments.

The split core 11 is constituted by plural core sheets, each of which is made of an electromagnetic steel sheet, laminated in a radial direction of the stator 1. As illustrated in FIG. 2B, each split core 11 includes a yoke portion 12 extending in the circumferential direction and a teeth portion 13 protruding from an inner peripheral side surface of the yoke portion 12 toward a direction of the rotation axis X and defining a magnetic pole. At an end portion of the teeth portion 13, a facing portion 131 which is shaped to be wide in the circumferential direction and is configured to face an outer peripheral surface of the rotor 2.

A round wire having a round cross section is used for the winding 20. A surface of an electrical conductor is protected with an insulating layer including, for example, an enamel coating. Instead of the round wire, thin wires having various shapes of cross section may be used as the winding 20 including, for example, a rectangular wire having a polygon shaped-cross section. Parallel thin wires, which are constituted by the plural thin wires arranged parallel to one another, may also be used as the winding 20.

The split core 11 is held in a sandwiched manner by a first bobbin 30 (serving as a bobbin) and a second bobbin 40 (serving as the bobbin), which are arranged at both sides of the split core 11 in the axial direction, respectively. The first bobbin 30 and the second bobbin 40 are made of an insulating material including, for example, resin, and are formed by injection molding. In this specification, a term "bobbin" refers to an insulating member electrically insulating the stator core 10 and the winding 20 from each other, and is also referred to as an insulator. As illustrated in FIG. 2A, the first bobbin 30 includes a body portion 31 around which the winding 20 is wound, an inner peripheral flange portion 32 provided at an inner peripheral side surface of the body portion 31 and extending in the axial direction, and an outer peripheral flange portion 33 provided at an outer peripheral side surface of the body portion 31 and extending in the axial direction. The inner peripheral flange portion 32 and the outer peripheral flange portion 33 are formed integrally with the body portion 31 so as to face each other. The first bobbin 30 is provided with a recessed portion and is configured to be attached to the teeth portion 13 from the axial direction in a manner that the first bobbin 30 partly covers the teeth portion 13. Circumferential end portions of the inner peripheral flange portion 32 are hereinafter referred to simply as inner peripheral side end portions 34, 34 of the first bobbin 30. Circumferential end portions of the outer peripheral flange portion 33 are hereinafter referred to simply as outer peripheral side end portions 35, 35 of the first bobbin 30.

Figure 2C:
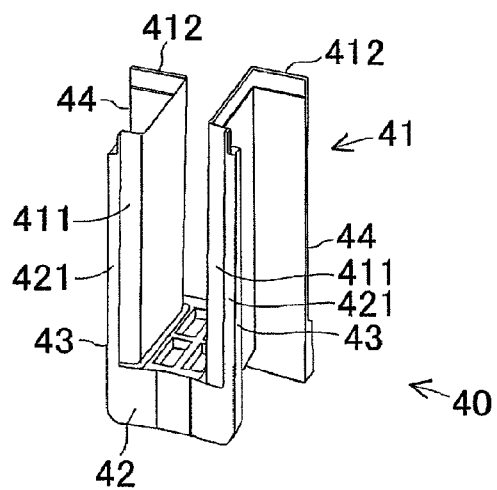
FIG. 2C is a perspective view schematically illustrating a structure of a second bobbin of the embodiments.

As illustrated in FIG. 2C, the second bobbin 40 includes a core holding portion 41 configured to hold the teeth portion 13 in the circumferential direction so that the teeth portion 13 fits in the core holding portion 41, and a core supporting portion 42 provided at the core holding portion 41 integrally therewith in the axial direction and is configured to support the teeth portion 13. Inner peripheral side end portions of the core holding portion 41 are bent in the circumferential direction to define inner peripheral side bent portions 411, 411. Outer peripheral side end portions of the core holding portion 41 are bent in the circumferential direction to define outer peripheral side bent portions 412, 412. The inner peripheral side bent portions 411, 411 are contactable with the facing portion 131 of the split core 11, and the outer peripheral side bent portions 412, 412 are contactable with the yoke portion 12 of the split core 11. Circumferential end portions of the core supporting portion 42 extend in the axial direction and define side surface supporting portions 421, 421. The side surface supporting portions 421, 421 are joined to the inner peripheral side bent portions 411, 411, respectively. Circumferential end portions of the side surface supporting portions 421, 421 are hereinafter referred to simply as inner peripheral side end portions 43, 43 of the second bobbin 40. Circumferential end portions of the outer peripheral side bent portions 412, 412 are referred to as outer peripheral side end portions 44, 44 of the second bobbin 40.

Figure 3A:
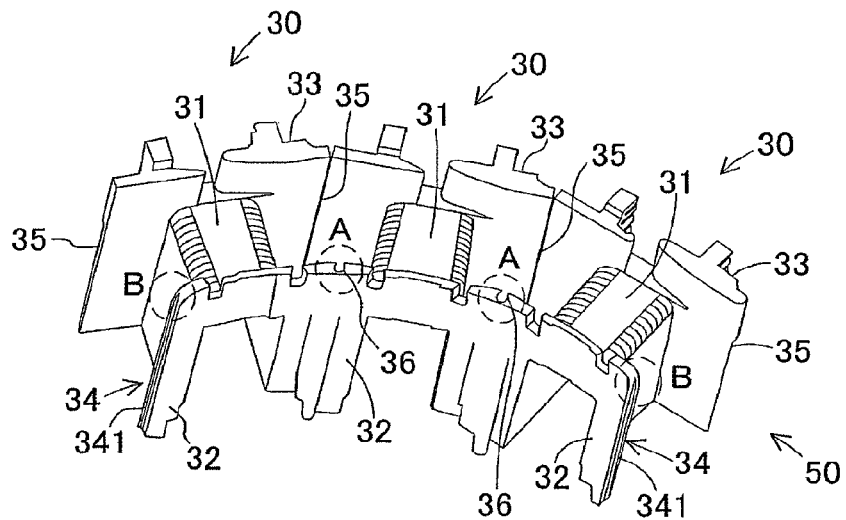
FIG. 3A is a perspective view schematically illustrating a first bobbin unit of the embodiments.
Figure 3B:
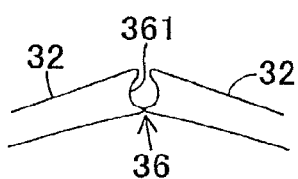
FIG. 3B is an enlarged view of a portion A of FIG. 3A.
Figure 3C:
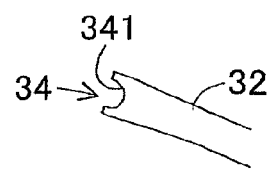
FIG. 3C is an enlarged view of a portion B of FIG. 3A.

As illustrated in FIG. 3A, at one side of the three split cores 11, 11, 11 in the axial direction, a first bobbin unit 50 is constituted by three of the first bobbins 30, 30, 30, as one unit, which are arranged in the circumferential direction. The first bobbin unit 50 serves as a bobbin unit. In the first bobbin unit 50, the inner peripheral side end portions 34, 34 of the first bobbin 30 positioned at a center among the three first bobbins 30, 30, 30 constituting the first bobbin unit 50 are bendably integrated with the corresponding inner peripheral side end portion 34 of each of the first bobbins 30, 30 adjoining to the first bobbin 30 positioned at the center, thereby defining first bent portions 36, 36. The outer peripheral side end portions 35, 35 of the first bobbin 30 positioned at the center are contactable with the corresponding outer peripheral side end portion 35 of each of the adjoining first bobbins 30, 30. As illustrated in FIG. 3B, each first bent portion 36 includes a first recessed portion 361 formed to be thin-walled and to open toward the outer periphery. Each of the first bobbins 30, 30 positioned at the ends in the circumferential direction among the three first bobbins 30, 30, 30 constituting the first bobbin unit 50 is pivotable about the corresponding first bent portion 36 toward the inner periphery. As illustrated in FIG. 3C, each of the inner peripheral side end portions 34, 34 positioned at circumferential ends of the first bobbin unit 50 includes a second recessed portion 341 formed to be thin-walled and to open toward the circumferential direction.

Figure 3D:
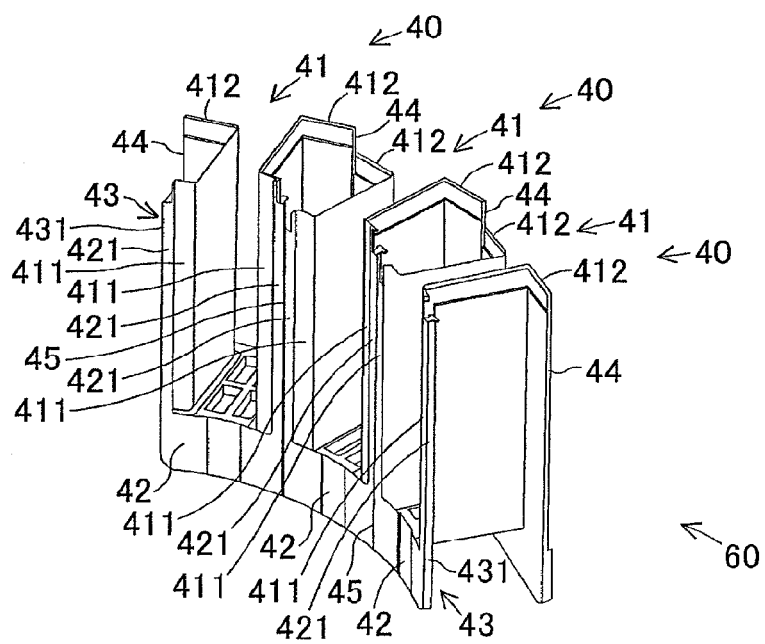
FIG. 3D is a perspective view schematically illustrating a second bobbin unit of the embodiments.

As illustrated in FIG. 3D, at the other side of the three split cores 11, 11, 11 in the axial direction, a second bobbin unit 60 is constituted by three of the second bobbins 40, 40, 40, as one unit, which are arranged in the circumferential direction. The second bobbin unit 60 serves as the bobbin unit. In the second bobbin unit 60, the inner peripheral side end portions 43, 43 of the second bobbin 40 positioned at a center among the three second bobbins 40, 40, 40 constituting the second bobbin unit 60 are bendably integrated with the corresponding inner peripheral side end portion 43 of each of the second bobbins 40, 40 adjoining to the second bobbin 40 positioned at the center, thereby defining second bent portions 45, 45. The outer peripheral side end portions 44, 44 of the second bobbin 40 positioned at the center are contactable with the corresponding outer peripheral side end portion 44 of each of the adjoining second bobbins 40, 40. Each second bent portion 45 includes a third recessed portion including a similar configuration to that of the first bent portion 36, that is, the third recessed portion is formed to be thin-walled and to open toward the outer periphery. Each of the second bobbins 40, 40 positioned at the ends in the circumferential direction among the three second bobbins 40, 40, 40 constituting the second bobbin unit 60 is pivotable about the corresponding second bent portion 45 toward the inner periphery. Each of the inner peripheral side end portions 43, 43 positioned at the circumferential ends of the second bobbin unit 60 includes a fourth recessed portion 431 including a similar configuration to that of the second recessed portion 341, that is, the fourth recessed portion is formed to be thin-walled and to open toward the circumferential direction.

Next, a manufacturing method of the above-explained three-phase rotary electrical machine by using the split core 11, the first bobbin unit 50, the second bobbin unit 60 and the winding 20 will be explained in detail with reference to FIGS. 4A to 6C. The manufacturing method of the three-phase rotary electrical machine of the first embodiment includes an assembly process, a winding process and a sealing process, and the stator 1 is manufactured in such an order.

Figure 4A:
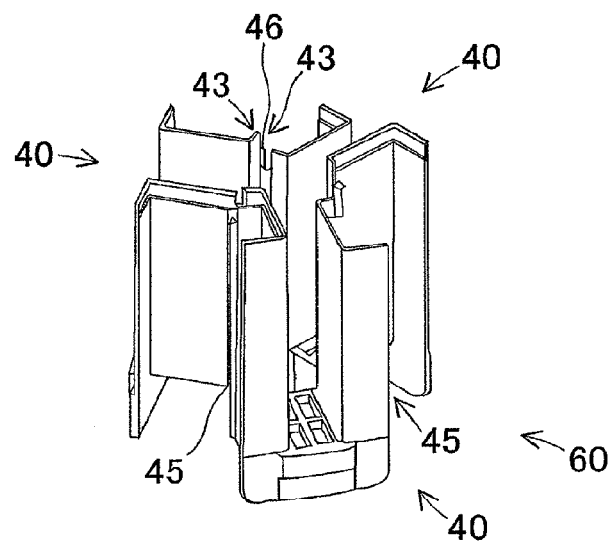
FIG. 4A is a perspective view explaining part of an assembly process of a stator of the embodiments, where the second bobbin unit is illustrated.
Figure 4B:
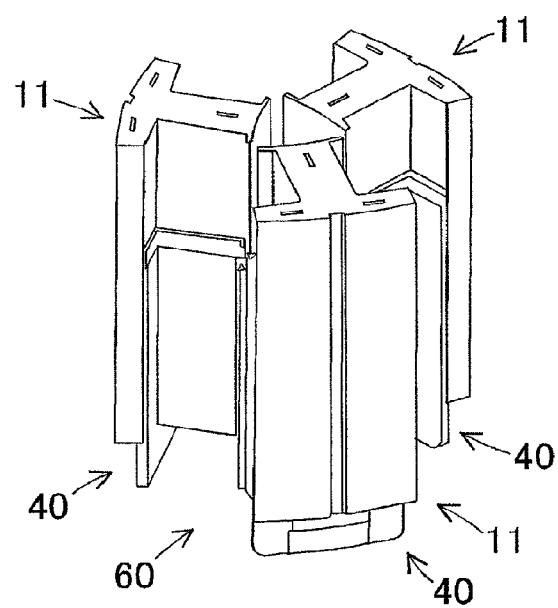
FIG. 4B is a perspective view explaining part of the assembly process of the stator of the embodiments, illustrating a state where the split core is attached to the second bobbin unit.

The assembly process will be explained below. The assembly process is a process where the first bobbin unit 50 and the second bobbin unit 60 are attached to the three split cores 11, 11, 11 from the both ends of the three split cores 11, 11, 11 in the axial direction, respectively. First, as illustrated in FIG. 4A, each of the second bobbins 40, 40 positioned at the circumferential ends among the three second bobbins 40, 40, 40 constituting the second bobbin unit 60 is pivoted about the corresponding second bent portion 45 toward the inner periphery so that the inner peripheral side end portions 43, 43 positioned at the circumferential ends are brought in contact with each other. In this state, as illustrated in FIG. 4B, the three split cores 11, 11, 11 are attached to the second bobbin unit 60.

Figure 5A:
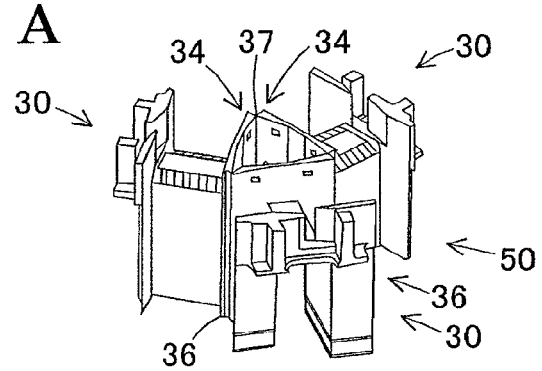
FIG. 5A is a perspective view explaining the assembly process of the stator of the embodiments, where the first bobbin unit is illustrated.
Figure 5B:
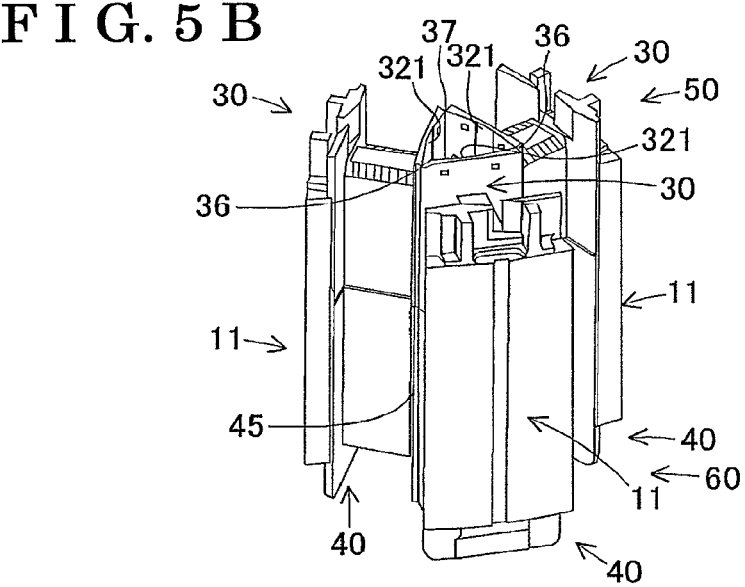
FIG. 5B is a perspective view explaining the assembly process of the stator of the embodiments, where the first bobbin unit and the second bobbin unit are attached to the split core is illustrated.

Next, as illustrated in FIG. 5A, each of the first bobbins 30, 30 positioned at the circumferential ends among the three first bobbins 30, 30, 30 constituting the first bobbin unit 50 is pivoted about the corresponding first bent portion 36 toward the inner periphery so that the inner peripheral side end portions 34, 34 positioned at the circumferential ends are brought in contact with each other. In this state, the three split cores 11, 11, 11 are attached to the first bobbin unit 50. At this time, a contacting portion 37 at which the inner peripheral side end portions 34, 34 of the first bobbin unit 50 are in contact with each other and a contacting portion 46 at which the inner peripheral side end portions 43, 43 of the second bobbin unit 60 are in contact with each other are aligned on a single straight line. FIG. 5B illustrates a state where the first bobbin unit 50 and the second bobbin unit 60 are attached to the three split cores 11, 11, 11 from the both ends of the three split cores 11, 11, 11 in the axial direction, respectively.

According to the first embodiment, the first bobbin unit 50 is attached to the three split cores 11, 11, 11 after the three split cores 11, 11, 11 are attached to the second bobbin unit 60. However, the second bobbin unit 60 may be attached to the three split cores 11, 11, 11 after the three split cores 11, 11, 11 are attached to the first bobbin unit 50. Alternatively, the inner peripheral side end portions 34, 34 may be brought in contact with each other and the inner peripheral side end portions 43, 43 may be brought in contact with each other as illustrated in FIG. 5B, after the three split cores 11, 11, 11 are held between the first bobbin unit 50 and the second bobbin unit 60 in a sandwiched manner. Further, in a modified embodiment, the second bobbin unit may be formed in a manner that the inner peripheral side end portions 43, 43 are formed to be connected or integrated with each other, and thus the second bent portions 45, 45, 45 are formed at three portions. The modified embodiment may include a cutting process where one of the second bent portions 45, 45, 45 (at three positions), which are formed between the second bobbins 40, 40, 40, is cut out after completion of the winding process. In a similar manner to the above, in the modified embodiment, the first bobbin unit may be formed in a manner that the inner peripheral side end portions 34, 34 are connected or integrated with each other at the contacting portion 37, and thus the first bent portions 36, 36, 36 are formed at three portions. After completion of the winding process, in the cutting process, one of the first bent portions 36, 36, 36 (at three positions), which are formed between the first bobbins 30, 30, 30, is cut out.

Figure 5C:
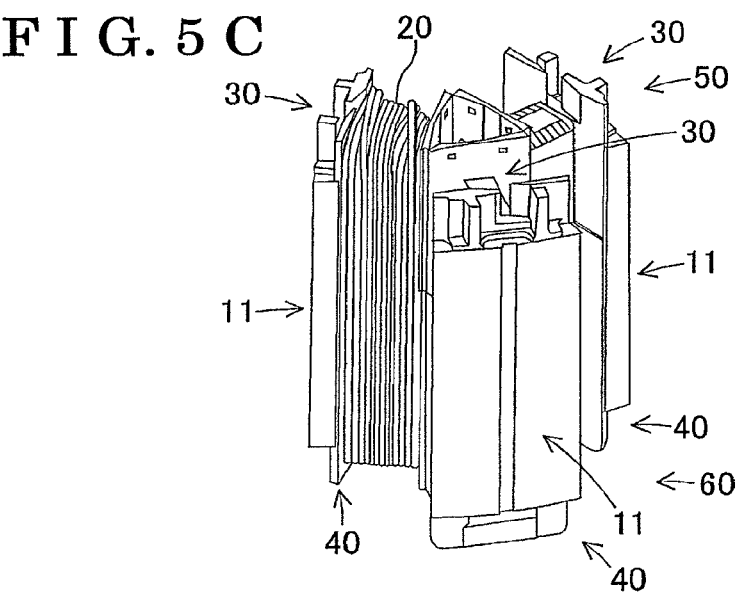
FIG. 5C is a perspective view explaining a winding process of the stator of the embodiments, where a winding for one phase is wound.
Figure 6A:
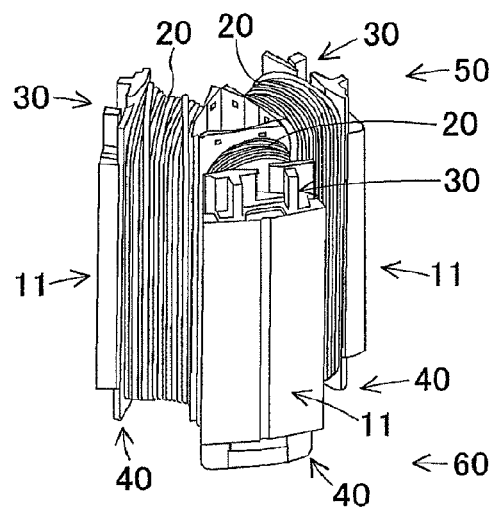
FIG. 6A is a perspective view explaining a state after the winding is completed according to the embodiments.
Figure 6B:
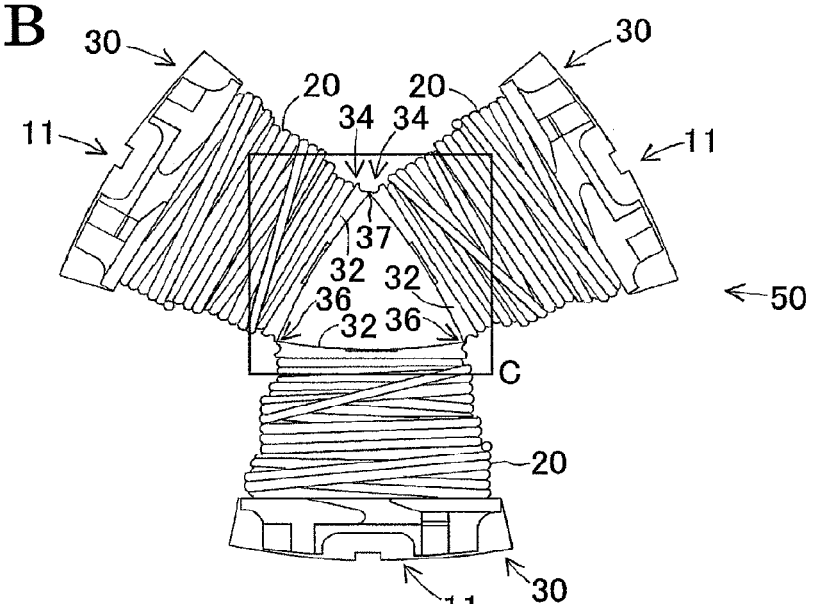
FIG. 6B is a top view explaining the state after the winding is completed according to the embodiments.
Figure 6C:
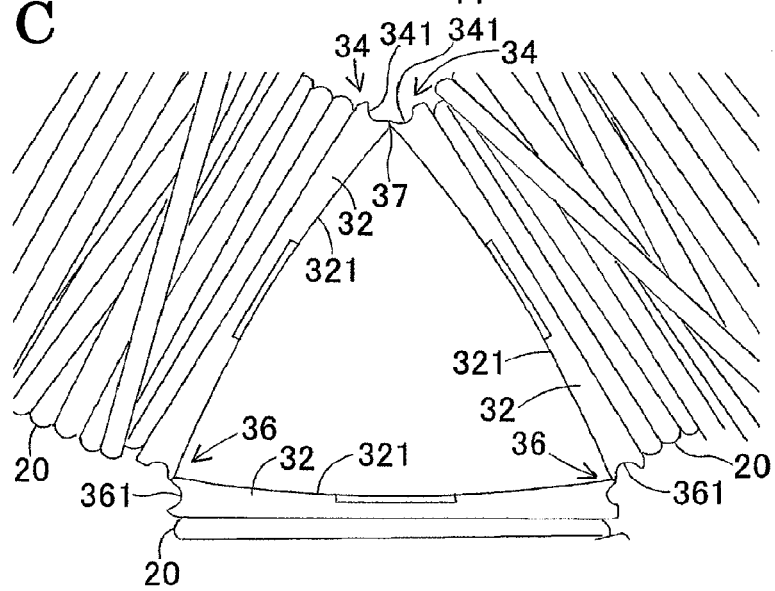
FIG. 6C is an enlarged view of a portion C of FIG. 6B.

The winding process will be explained below. The winding process is a process where inner peripheral side surfaces 321, 321, 321 of the first bobbin unit 50 attached to the three split cores 11, 11, 11 are arranged to define a triangular configuration when viewed in the axial direction as illustrated in FIG. 5B, and where the winding 20 is wound. The winding of the windings 20 for the three phases may be performed in a manner that after completion of winding for one phase, the winding is performed for a next phase as illustrated in FIG. 5C. Alternatively, the winding of the windings 20 may be performed for two or three phases at the same time. FIGS. 6A to 6C respectively illustrate a state where the windings 20 for the three phases are wound.

As illustrated in FIGS. 6A and 6C, a feature of the winding process is that the winding is performed in a state where the inner peripheral side surfaces 321, 321, 321 of the first bobbin unit 50 are arranged to define the triangular configuration when viewed in the axial direction. Each of the first bent portions 36, 36 and the contacting portion 37 corresponds to an apex of the triangular configuration. By performing the winding in the state where the inner peripheral side surfaces 321, 321, 321 are arranged to define the triangular configuration, while the winding is being performed for one of the three phases, it is restricted that the bobbins for other phases interfere with the bobbin for the phase on which the winding is being performed, and thus an operation efficiency is enhanced. In addition, by performing the winding in the state where the triangular configuration is defined, the windings 20 for two or three phases may be wound at the same time. The inner peripheral side surfaces 321, 321, 321 are not arranged to define an exact triangular configuration when viewed in the axial direction because each inner peripheral side surface 321 is formed to be curved in the circumferential direction, however, the shape defined by the inner peripheral side surfaces 321, 321, 321 is referred to as the triangular configuration in the embodiments for convenience of the explanation.

By arranging the inner peripheral side surfaces 321, 321, 321 of the first bobbin unit 50 in the triangular configuration when viewed in the axial direction, inner peripheral side surfaces of the second bobbin unit 60, which respectively mate with the inner peripheral side surfaces 321, 321, 321, are arranged to define the triangular configuration. Consequently, the winding process also refers to a process where the inner peripheral side surfaces of the second bobbin unit 60 are arranged to define the triangular configuration when viewed in the axial direction and where the winding 20 is wound. In this case, each of the inner peripheral side surfaces refers to a surface defined by the inner peripheral side bent portions 411, 411 and the side surface supporting portions 421, 421 in the circumferential direction. In a case of the aforementioned modified embodiment, the cutting process is added after the winding process. In the cutting process, one of the first bent portions 36, 36, 36 (at three positions) corresponding to the apices of the triangular configuration of the first bobbin unit is cut out in the axial direction. In the similar manner, in the cutting process added after the winding process, one of the second bent portions 45, 45, 45 (at three positions) corresponding to the apices of the triangular configuration of the second bobbin unit is cut out in the axial direction. In the modified embodiment, the winding 20 is wound around the first and second bobbin units where the inner peripheral side surfaces are arranged to define the triangular configuration when viewed in the axial direction, and thereafter one of the apices of the triangular configuration is cut out. Accordingly, there is no need to bring the inner peripheral side end portions 34, 34 positioned at the circumferential ends to be in contact with each other or to bring the inner peripheral side end portions 43, 43 positioned at the circumferential ends to be in contact with each other before the winding, which enhances an operation efficiency. In addition, the three split cores 11, 11, 11, the first bobbin unit and the second bobbin unit are assembled easily.

The sealing process will be explained below. The sealing process is a process where the first and second bobbin units 50 and 60, around which the windings 20 are wound, are arranged in the circumferential direction, and the first bobbin unit 50 and the first bobbin unit 50 positioned adjoining thereto, and the second bobbin unit 60 and the second bobbin unit 60 positioned adjoining thereto are respectively sealed with each other at the inner peripheral side portions. As illustrated in FIGS. 6B and 6C, in a state where the windings 20 for the three phases are wound, each of the first bobbins 30, 30 that are adjoining to the contacting portion 37 is pivoted about the respective first bent portion 36 in a manner that an opened portion of the first bent portion 36 is narrowed. By pivoting the first bobbins 30, 30 in the aforementioned manner until the inner peripheral side surfaces 321, 321, 321 come to be arranged on an identical circumference, a state of the stator unit 1U which is illustrated in FIG. 1 is obtained. By pivoting the second bobbins 40, 40 that are adjoining to the contacting portion 46 of the second bobbin unit 60 in a manner similar to the above, the state of the stator unit 1U which is illustrated in FIG. 1 is obtained. In this case, the second bobbins 40, 40 are pivoted in a direction in which each opened portion of the second bent portions 45, 45 is narrowed.

Figure 7:
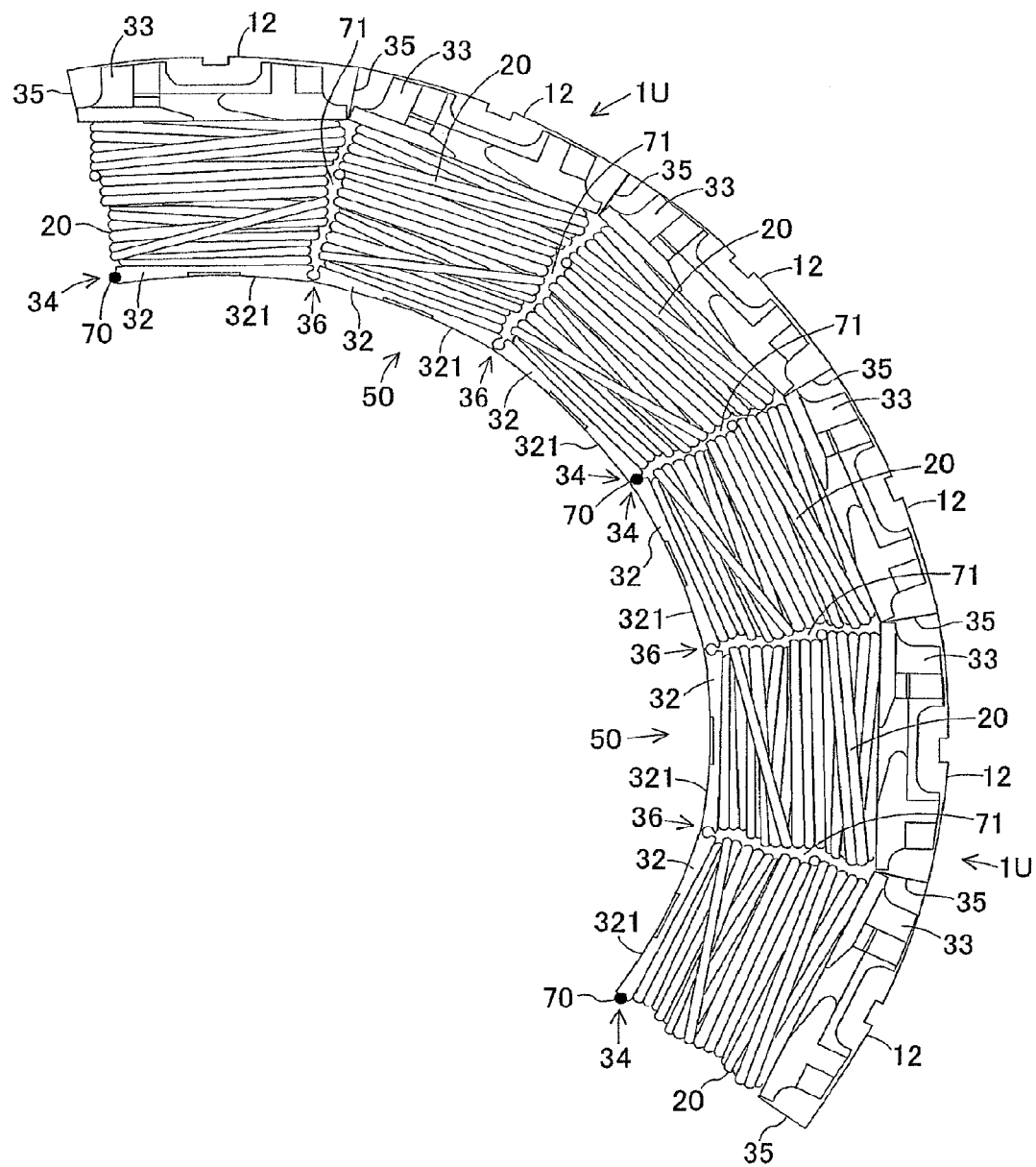
FIG. 7 is a top view schematically illustrating part of the stator of the embodiments.

As illustrated in FIG. 7, two of the stator units 1U, 1U are arranged in the circumferential direction. The two of the first bobbin units 50, 50 adjoining to each other in the circumferential direction are sealed with each other at the inner peripheral side end portions 34, 34 by means of a first sealing member 70. In a similar manner to that of the first bobbin unit 50, the two of the second bobbin units 60, 60 adjoining to each other in the circumferential direction are sealed with each other at the inner peripheral side end portions 43, 43 by means of the first sealing member 70. The first sealing member 70 is retained in a sandwiched manner between the inner peripheral side end portions 34, 34 of the first bobbin units 50, 50 and between the inner peripheral side end portions 43, 43 of the second bobbin units 60, 60 while the stator 1 is securely fitted in a stator housing 100 by shrink fitting or press fitting. The first sealing member 70 is formed in a shape that matches a shape defined by the inner peripheral side end portions 34, 34 and defined by the inner peripheral side end portions 43, 43. In the first embodiment, the first sealing member 70 having an annular shape when viewed in an axial direction thereof is used because the inner peripheral side end portions 34, 34 brought into contact with each other define a cross section of an annular shape when viewed in the axial direction, and the inner peripheral side end portions 43, 43 brought into contact with each other define a cross section of the annular shape when viewed in the axial direction. An insulating material, including, for example, rubber may be used as the first sealing member 70. Each inner peripheral side end portion 34 and each inner peripheral side end portion 43 are formed in an identical configuration to each other, and thus are in fluid communication with each other in the axial direction. Accordingly, the first sealing member 70 is formed in one piece in the axial direction of the first bobbin unit 50 and the second bobbin unit 60, however, the first sealing member 70 may be formed in, for example, two pieces.

In the first embodiment, a cooling passage 71 extending in the axial direction is provided between the three-phase windings 20, 20, that is, at each clearance between the windings 20 for the three phases. Because the cooling passage 71 is provided in the axial direction between the three-phase windings 20, 20, cooling medium is allowed to flow between the three-phase windings 20, 20, and thus each winding 20, which releases the highest amount of heat among parts and components of the stator 1, is directly cooled. In addition, the inner peripheral side end portions 34, 34 positioned at circumferentially ends of the first bobbin unit 50 are sealed with each other by means of the first sealing member 70 and the inner peripheral side end portions 43, 43 positioned at circumferentially ends of the second bobbin unit 60 are sealed with each other by means of the first sealing member 70, and thus it is restricted that the cooling medium which removes the heat from the winding 20 flows out to a rotor side. Consequently, heat transfer via or by means of the cooling medium to the rotor 2 and friction loss occurring at the rotor 2 are reduced.

Because the first bobbin unit 50 is constituted by the three first bobbins 30, 30, 30 which are arranged adjoining to one another in the circumferential direction and integrated with one another into one unit, there is no need to provide the first sealing member 70 at the inner peripheral side end portions (the first bent portions 36, 36) between the first bobbin 30 positioned at the center and the adjoining first bobbins 30, 30. Thus, an amount of the first sealing member 70 used is reduced to one third of an amount of the first sealing member 70 that would be used in a case each inner peripheral side end portion of the three first bobbins 30, 30, 30 is sealed with the first sealing member 70. In addition, each first bent portion 36 is fluid communication in the axial direction, thereby serving as a flow channel of the cooling medium. Thus, a flow passage of the cooling medium is increased, which enhances a cooling performance. In addition, the three first bobbins 30, 30, 30 which are formed to be integrated into one unit, the number of components of the stator 1 is reduced. By reducing the number of the parts and components, reliability is enhanced and costs are reduced. The same also applies to the second bobbin unit 60.

Figure 8:
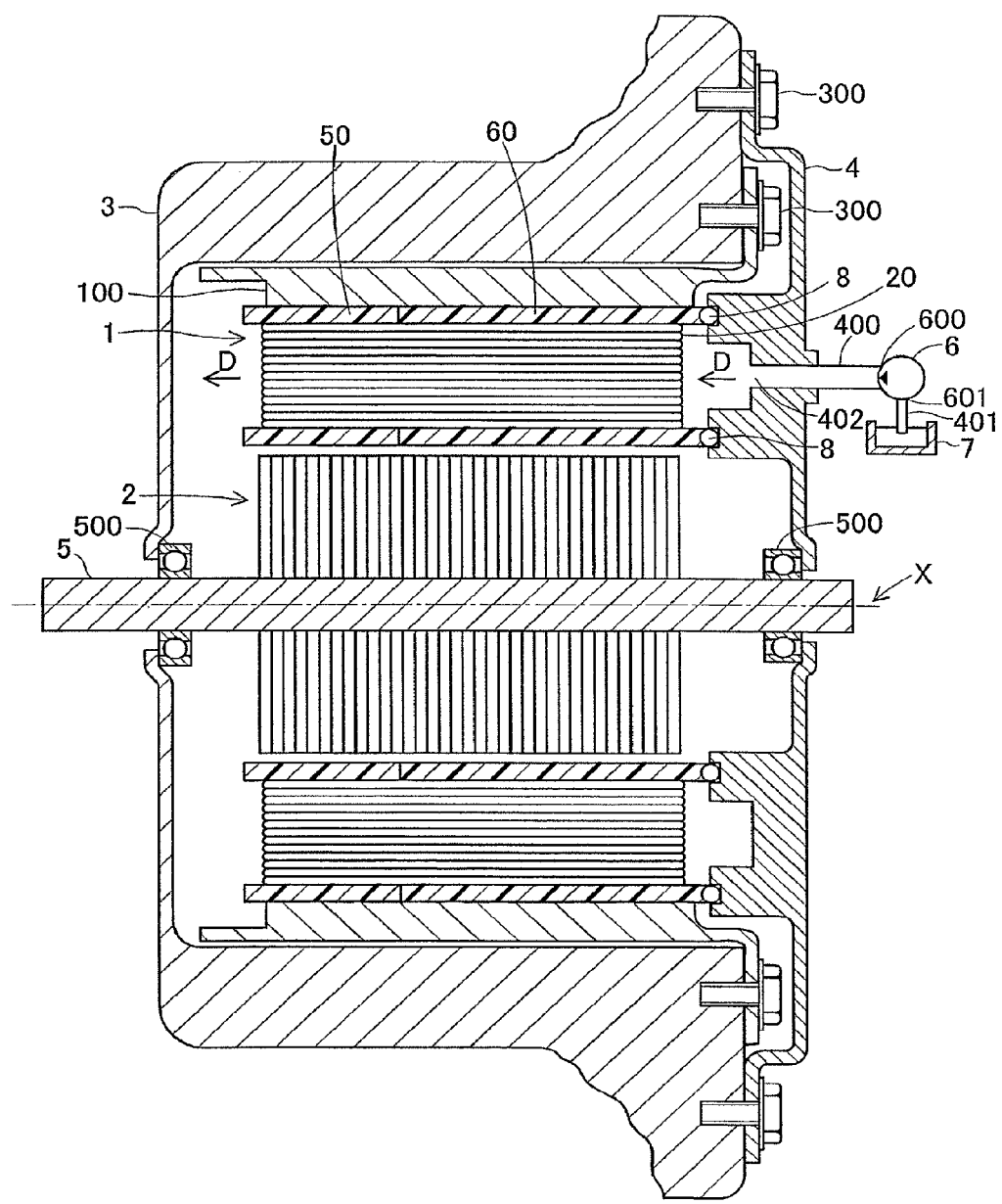
FIG. 8 is a cross-sectional view illustrating an example of a three-phase electric motor of the embodiments.

<Three-phase rotary electrical machine> FIG. 8 is a cross-sectional view illustrating an example of the three-phase electric motor. The three-phase electric motor illustrated in FIG. 8 is a three phase synchronous motor for driving wheels of a hybrid vehicle, and is sealed with a motor cover 4 (serving as a cooling medium supply cover) in a state where the stator 1 and the rotor 2, which are explained above, are contained in a motor housing 3. One end of the three-phase electric motor is connected to a transmission of a vehicle and the other end of the three-phase electric motor is connected to an output shaft of an engine in an engageable and disengageable manner.

The stator 1 is fixedly mounted on the motor housing 3 with a bolt 300 via the stator housing 100. The stator 1 includes the above-explained stator units 1U arranged in the circumferential direction of the rotation axis X to form an annular shape. The adjoining stator units 1U, 1U are sealed with each other at the inner peripheral side end portions by means of the first sealing member 70. The windings 20 for a same phase are serially-connected with each other. One end of each of the serially-connected windings 20 is connected in a Y-connection and the other end of each of the serially-connected windings 20 is connected to a vehicle battery via an inverter. Electric power of the vehicle battery is converted into three-phase alternating current by the inverter, and then supplied to the three-phase electric motor for driving the rotor 2. Electric power generated by the three-phase rotary electrical machine is charged at the vehicle battery via the inverter. In FIG. 8, the stator 1 is schematically illustrated in order to clearly represent that the cooling medium flows between the three-phase windings 20, 20 in the axial direction (a direction of an arrow D illustrated in FIG. 8).

The rotor 2 is arranged at a radially inner side relative to the stator 1 to face the stator 1 while leaving a predetermined gap therebetween. The rotor 2 is constituted by plural lamination steel plates, and plural pieces of magnet for a field pole are provided on a circumference of the rotor 2. The rotor 2 is fixedly arranged coaxially with a shaft 5 so as to be rotatable. The shaft 5 is supported via bearings 500, 500 at the motor housing 3 and the motor cover 4. The motor cover 4 is fixed to the motor housing 3 with the bolt 300. When three-phase alternating current is supplied from the vehicle battery via the inverter to the winding 20, a revolving magnetic field is generated at the stator 1. Thus, the rotor 2 is rotated relative to the stator 1 by a magnetic attractive force or a magnetic repulsive force that are caused by the revolting magnetic field.

The motor cover 4 is formed with a pipe 400 (serving as a pipe) protruding in the direction of the rotation axis X for discharging the cooling medium. The pipe 400 is connected to an outlet port 600 of a pump 6. An inlet port 601 of the pump 6 is connected by means of a pipe 401 to a reservoir 7. The reservoir 7 reserves the cooling medium for cooling the windings 20 of the stator 1. As the cooling medium, a coolant material including, for example, oil, air or nitrogen may be used. In FIG. 8, the pump 6 and the reservoir 7 are provided separately from the three-phase electric motor, however, in an actual use, the pump 6 is provided integrally with the three-phase electric motor and the reservoir 7 is formed inside the motor housing 3.

Axial end portions of the second bobbin unit 60 is connected to the motor cover 4 via O-rings 8, 8 made of rubber, and each connecting portion is sealed so that the cooling medium delivered from the pump 6 does not leak out in a direction of the rotor 2 or in the direction of the stator housing 100. The axial end portions of the second bobbin unit 60 serve as the inner peripheral flange portion and the outer peripheral flange portion, respectively. The O-rings 8, 8 respectively serve as a second sealing member. As illustrated in FIG. 8, a portion of the motor cover 4, the portion which projects in a direction of the stator 1, serves as a projection portion. The cooling medium delivered from the pump 6 is introduced to the pipe 400 and is discharged via an opening portion 402 (serving as an opening portion) of the pipe 400 toward the windings 20 of the stator 1. The cooling medium flows between the three-phase windings 20, 20 in the direction of the arrow D, and is discharged to the reservoir 7 via a piping. As the cooling medium passes between the three-phase windings 20, 20, the cooling medium removes the heat generated at each winding 20 due to actuation of the three-phase electric motor.

According to the three-phase electric motor of the embodiment, the inner peripheral side end portions of the adjoining stator units 1U, 1U are sealed with each other with the first sealing member 70, and thus it is restricted that the cooling medium flowing between the three-phase windings 20, 20 in the direction of the arrow D flows out toward the rotor 2. Consequently, the heat transfer via the cooling medium to the rotor 2, and the friction loss occurring at the rotor 2 are reduced. In order to further restrict the cooling medium from flowing out in the direction of the rotor 2, a cover similar to the motor cover 4 may be arranged at a side where the cooling medium is discharged, so that the inner peripheral flange portion 32 and the outer peripheral flange portion 33 of the first bobbin unit 50 engage with a projection portion similar to the projection portion formed at the motor cover 4.

(2) The second embodiment will be explained hereunder. In the second embodiment, a configuration of the cooling passage 71, which is provided between the three-phase windings 20, 20, differs from that of the first embodiment. More specifically, in the second embodiment, a correlation distance between the adjoining windings 20, 20 at the cooling passage 71 is set to become gradually shorter from a supply side toward a discharge side, and thus the cooling passage 71 is formed so that a flow path of the cooling medium at the discharge side is narrower than that at the supply side of the cooling medium. In the second embodiment, the identical numerical designations are given to identical parts, portions and the like to those of the first embodiment, thereby omitting duplicated description of these parts or portions.

Figure 9:
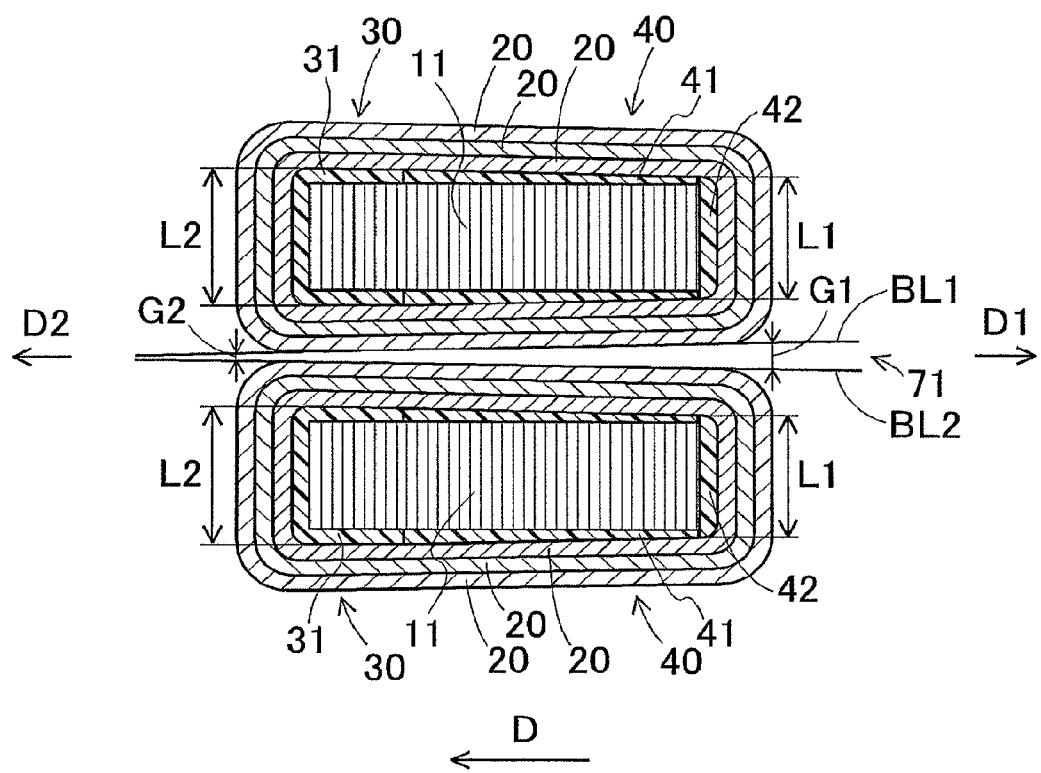
FIG. 9 is a cross-sectional view, viewed in a radial direction of the stator, explaining a cooling passage of the second embodiment disclosed here.

In FIG. 9, the split cores 11, 11 for two phases are cut in the axial direction and the cooling passage 71 provided between the corresponding windings 20, 20 is schematically illustrated. As illustrated in FIG. 9, the supply side of the cooling medium is indicated with a direction of an arrow D1 and the discharge side of the cooling medium is indicated with a direction of an arrow D2. That is, the cooling medium is supplied from the side indicated with the direction of the arrow D1 to the side indicated with the direction of the arrow D2 (that is, in the direction of the arrow D). A boundary between a heat exchange surface of each of the winding 20, 20 and the cooling medium is referred to as a boundary layer BL1 and a boundary layer BL2, respectively. For convenience of the explanation, each of the windings 20, 20 is wound three times around the corresponding first bobbin 30 and the corresponding second bobbin 40, and a state where the windings 20, 20 are wound is illustrated with the three-layered annular rings.

As illustrated in FIG. 9, at the first bobbin 30 and the second bobbin 40, thickness of a portion at which the winding 20 is wound around is configured to be smallest at the supply side of the cooling medium (the side indicated with the direction of the arrow D1) and becomes gradually larger toward the discharge side of the cooling medium (the side indicated with the direction of the arrow D2). More specifically, at the core holding portion 41 of the second bobbin 40, the thickness of the portion at which the winding 20 is wound around is configured to be smallest at a portion connected to the core supporting portion 42 and to become gradually larger toward the discharge side of the cooling medium (the side indicated with the direction of the arrow D2). A circumferential length of the portion at which the thickness of the core holding portion 41 is smallest in the axial direction (that is, the portion connected to the core supporting portion 42) is referred to as a shortest circumferential length L1.

At the body portion 31 of the first bobbin 30, thickness of a portion around which the winding 20 is wound is configured to be smallest at a portion connected to the core holding portion 41 and become gradually larger toward the discharge side of the cooling medium (the side indicated with the direction of the arrow D2). A circumferential length of the portion at which the thickness of the body portion 31 is longest in the axial direction is referred to as a longest circumferential length L2. Thus, at the first bobbin 30 and the second bobbin 40, because the thickness of the portion around which the winding 20 is wound is configured to gradually change, the longest circumferential length L2 is longer compared to the shortest circumferential length L1. Accordingly, in a state where the windings 20, 20 are wound around the first bobbin 30 and around the second bobbin 40, a correlation distance G1 between the windings 20, 20 at the cooling passage 71 at the supply side (the side indicated with the direction of the arrow D1) of the cooling medium is longer than a correlation distance G2 between the windings 20, 20 at the cooling passage 71 at the discharge side (the side indicated with the direction of the arrow D2) of the cooling medium.

It is generally known that "an amount of heat removed is proportional to a temperature difference and to a heat transfer area, and is (theoretically) proportional to square root of a flow rate". At the supply side (the side indicated with the direction of the arrow D1) of the cooling medium, a difference between temperature of the windings 20, 20 and temperature of the cooling medium is larger, and thus a cooling efficiency is higher compared to the discharge side (the side indicated with the direction of the arrow D2) of the cooling medium. Thus, even in a case where a flow rate of the cooling medium is set to be lower at the supply side (the side indicated with the direction of the arrow D1) than that at the discharge side (the side indicated with the direction of the arrow D2), sufficient amount of heat is removed. On the other hand, at the discharge side (the side indicated with the direction of the arrow D2) of the cooling medium, the temperature of the cooling medium rises as the cooling medium removes the heat from the windings 20, 20, and thus the difference between the temperature of the windings 20, 20 and the temperature of the cooling medium becomes smaller, which decreases the cooling efficiency. Therefore, the flow rate of the cooling medium is set higher at the discharge side (the side indicated with the direction of the arrow D2) than at the supply side (the side indicated with the direction of the arrow D1) in order to assure the necessary amount of heat removed.

According to the second embodiment, the correlation distance G1, G2 between the windings 20, 20 at the cooling passage 71 is set to become gradually shorter from the supply side (the side indicated with the direction of the arrow D1) toward the discharge side (the side indicated with the direction of the arrow D2) of the cooling medium supplied to the cooling passage 71, which therefore allows the flow rate of the cooling medium at the discharge side (the side indicated with the direction of the arrow D2) to be higher than that at the supply side (the side indicated with the direction of the arrow D1). Consequently, the flow rate of the cooling medium may be set so as to become gradually higher from the supply side (the side indicated with the direction of the arrow D1) toward the discharge side (the side indicated with the direction of the arrow D2) of the cooling medium, and thus amount of heat removed from the windings 20, 20 is equalized.

Thickness of each of the boundary layer BL1 and the boundary layer BL2 may change depending on, for example, a resistance of a flow channel of the cooling passage 71 and/or viscosity of the cooling medium, and a required flow rate of the cooling medium may change. Thus, it is favorable to derive in advance the correlation distances G1, G2 between the windings 20, 20 at the cooling passage 71 in consideration of the resistance of the flow channel of the cooling passage 71 and/or the viscosity of the cooling medium. A method for deriving the correlation distances G1, G2 between the windings 20, 20 at the cooling passage 71 is not limited to any particular method. The correlation distances G1, G2 may be derived, for example, by means of a known simulation of a convection heat transfer or through measurement conducted on an actual machine.

In addition, a method for changing the correlation distance G1 and/or G2 between the windings 20, 20 at the cooling passage 71 is not limited to any particular method. For example, the correlation distances G1 and/or G2 between the windings 20, 20 at the cooling passage 71 may be changed by winding the windings 20, 20 at the supply side (the side indicated with the direction of the arrow D1) and at the discharge side (the side indicated with the direction of the arrow D2) in different ways from each other. In addition to employing the aforementioned different ways of winding the winding 20, the thickness of the portion around which the winding 20 is wound may be gradually changed at the first bobbin 30 and the second bobbin 40.

(3) The third embodiment will be explained hereunder. The third embodiment differs from the first and second embodiments in that the first bobbin unit 50 and the second bobbin unit 60 are not constituted. One of the first bobbins 30 and another one of the first bobbins 30 which are adjoining to each other in the circumferential direction are sealed with each other at the corresponding inner peripheral side end portions 34, 34 of the first bobbins 30, 30. One of the second bobbins 40 and another one of the second bobbins 40 which are adjoining to each other in the circumferential direction are sealed with each other at the corresponding inner peripheral side end portions 43, 43 of the second bobbins 40, 40. In the third embodiment, the identical numerical designations are given to identical parts, portions and the like to those of the first and the second embodiments, thereby omitting duplicated description of these parts or portions.

Figure 10:
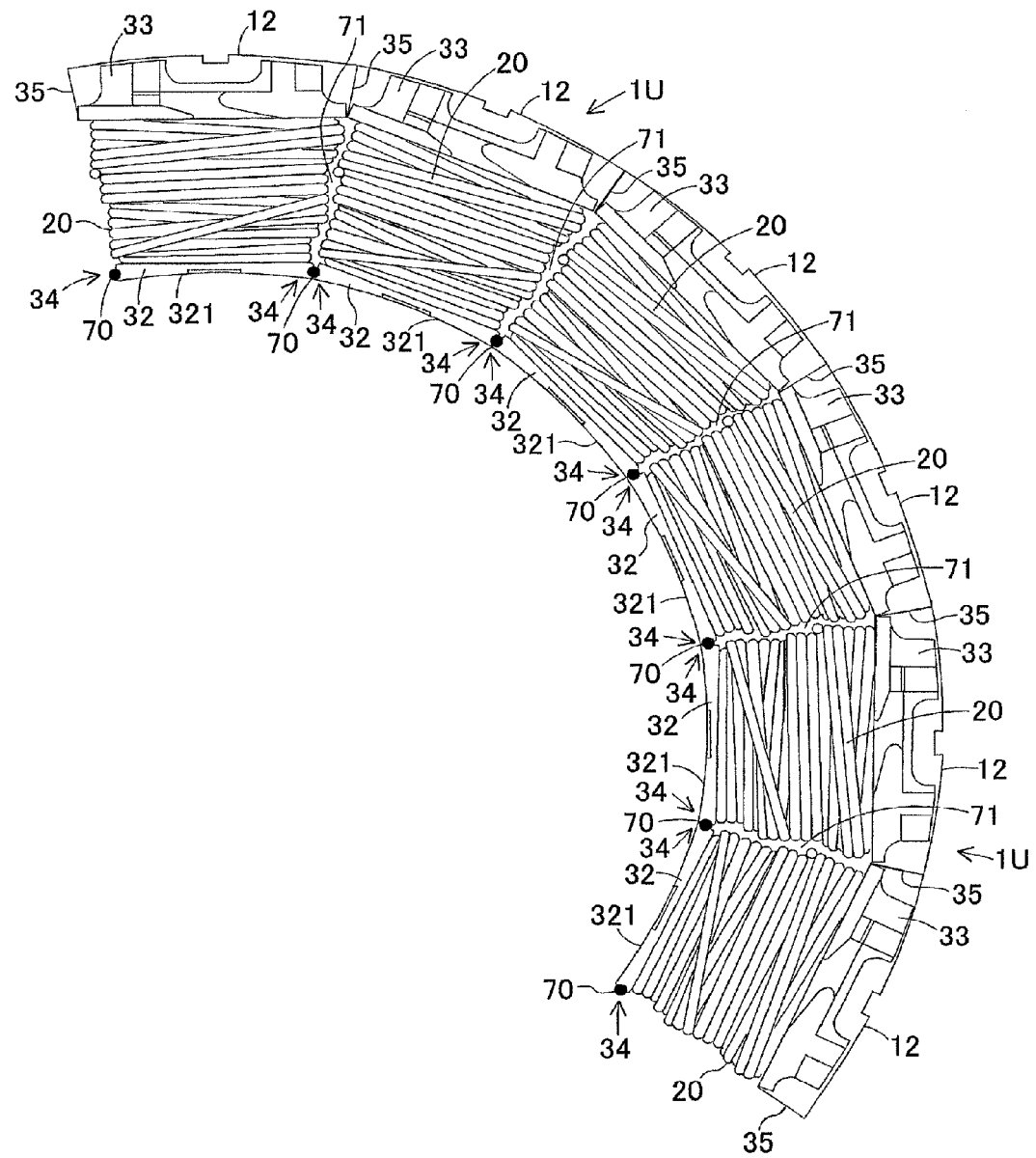
FIG. 10 is a top view schematically illustrating part of a stator of the third embodiment disclosed here.

In FIG. 10, six of the first bobbins 30, which correspond to two of the stator units 1U, 1U, are arranged in the circumferential direction. One of the first bobbins 30 and another one of the first bobbins 30 which are adjoining to each other in the circumferential direction are sealed with each other at the corresponding inner peripheral side end portions 34, 34 of the first bobbins 30, 30 by means of the first sealing member 70. In a similar manner to that of the first bobbins 30, one of the second bobbins 40 and another one of the second bobbins 40 which are adjoining to each other in the circumferential direction are sealed with each other at the corresponding inner peripheral side end portions 43, 43 of the second bobbins 40, 40 by means of the first sealing member 70. The first sealing member 70 is retained in the sandwiched manner between the inner peripheral side end portions 34, 34 of the adjoining first bobbins 30, 30 and between the inner peripheral side end portions 43, 43 of the adjoining second bobbins 40, 40 while the stator 1 is securely fitted in the stator housing 100 by the shrink fitting or the press fitting. The material, shape and the like of the first sealing member 70 are similar to those explained in the first and the second embodiments.

In the third embodiment, the cooling passage 71 extending in the axial direction is provided between the three-phase windings 20, 20 in a similar manner to that of the first and second embodiments. Thus, the cooling medium circulates among the three-phase windings 20, and thus each winding 20, which releases the highest amount of heat among the parts and the components of the stator 1, is directly cooled. One of the first bobbins 30 and another one of the first bobbins 30 positioned adjoining thereto are sealed with each other at the corresponding inner peripheral side end portions 34, 34 of the first bobbins 30, 30, and one of the second bobbins 40 and another one of the second bobbins 40 positioned adjoining thereto are sealed with each other at the corresponding inner peripheral side end portions 43, 43 of the second bobbins 40, 40. Accordingly, it is restricted that the cooling medium which removes the heat from the winding 20 flows out to the rotor side. Consequently, the heat transfer via the cooling medium to the rotor and the friction loss occurring at the rotor are reduced.

The manufacturing method of the three-phase rotary electrical machine of the third embodiment includes the assembly process, the winding process and the sealing process, and the stator 1 is manufactured in such an order. In the assembly process, the first bobbin 30 and the second bobbin 40 are attached to single split core 11 from the both ends of the split core 11 in the axial direction, respectively. In the winding process, the winding 20 is wound around the first bobbin 30 and the second bobbin 40, which are attached to the split core 11. In the sealing process, the first bobbins 30 and the second bobbins 40, around each of which the winding 20 is wound, are arranged along the circumferential direction, and the adjoining first bobbins 30, 30 are sealed with each other at the corresponding inner peripheral side end portions 34, 34, and the adjoining second bobbins 40, 40 are sealed with each other at the corresponding inner peripheral side end portions 43, 43. In the winding process, three of the first bobbins 30, 30, 30 may be fixed in a manner that the inner peripheral side surfaces 321, 321, 321 of the three first bobbins 30, 30, 30 are arranged to define the triangular configuration when viewed in the axial direction, and the winding of the winding 20 may be performed. The winding of the winding 20 is performed on the second bobbins 40 in a similar manner.

(4) Others This disclosure is not limited to the embodiments that are described above and are illustrated in the drawings, and may be appropriately changed or modified without departing from the subject matter of the disclosure. For example, two bobbins arranged in the circumferential direction may constitute one bobbin unit, and the bobbin unit may be attached at each axial end of the split core.

The rotor may employ permanent magnet or a winding. The rotor employing the permanent magnet does not suffer from temperature rise caused by the heat generated at the winding, and thus does not need to be protected from the heat. Further, the three-phase rotary electrical machine may be any of a direct-current machine, a synchronous machine and an induction machine. A magnetic force may be adjusted by an energizing current in a case where direct-current energization is applied, and speed may be controlled by frequencies in a case where alternating-current energization is applied. Starting characteristic may be changed by a resistance value connected to the winding in case of the induction machine.

The rotor may be an inner rotor arranged at the radially inner side relative to the stator or may be an outer rotor arranged at a radially outer side relative to the stator. An inner rotor includes a low moment of inertia, and therefore the speed of the three-phase electric motor may be easily controlled. On the other hand, an outer rotor includes a high moment of inertia, and thus generates a high driving torque, thereby being advantageous in operating at a constant speed.

According to the embodiments, the three-phase rotary electrical machine includes the stator 1 including the stator core 10 including the split cores 11 split in the circumferential direction of the rotation axis X, the rotor 2 arranged coaxially with and facing the stator 1, the first and second bobbins 30, 40 made of the insulating material and attached to each of the split cores 11, the winding 20 being wound in the concentrated winding method around each split core 11 to which the first and second bobbins 30, 40 are attached, the winding 20 being provided for each of the three phases of the rotary electrical machine, and the first and second bobbin units 50, 60 respectively including three of the first and second bobbins 30, 40 (that is, the first bobbin unit 50 includes three of the first bobbins 30 and the second bobbin unit 60 includes three of the second bobbins 40) which are arranged in the circumferential direction as one unit, wherein each of the first and second bobbins 30, 40 includes the inner peripheral side end portions 34, 43, the inner peripheral side end portions 34, 43 of the first and second bobbins 30, 40 positioned at the center among the three first and second bobbins 30, 40 of the first and second bobbin unit 50, 60 are formed in the bendable manner integrally with the corresponding inner peripheral side portion 34, 43 of each of the first and second bobbins 30, 40 positioned adjoining to the first and second bobbins 30, 40 positioned at the center, the first and second bobbin units 50, 60 are respectively split in the axial direction of the rotation axis X in such a way that the first and second bobbin units 50, 60 are configured to be attached to three of the split cores 11 from the axial ends of the three split cores 11, the three of the split cores 11 are attached with the first and second bobbin units 50, 60 from the axial ends, the first and second bobbin units 50, 60 are sealed at the corresponding inner peripheral side end portions 34, 43 with the first and second bobbin units 50, 60 positioned adjoining thereto, and the cooling passage 71 extending in the axial direction is provided at each clearance between the windings 20 for the three phases.

According to the above described structure, the bobbin unit 50, 60 is sealed with the adjoining bobbin unit 50, 60 at the inner peripheral side end portions 34, 43, and the cooling passage 71 extending in the axial direction is provided at each clearance between the three-phase windings 20. Accordingly, the cooling medium is allowed to flow between the three-phase windings 20, and thus each winding 20, which releases the highest amount of heat among the parts and the components of the stator 1, is directly cooled. In addition, the inner peripheral side end portions 34, 43 of the adjoining bobbin units 50, 60 are sealed with each other, and thus it is restricted that the cooling medium which removes the heat from the winding 20 flows out to a rotor side. Accordingly, the heat transfer via the cooling medium to the rotor 2 and the friction loss occurring at the rotor 2 are reduced.

According to the above described structure, because the bobbin unit 50, 60 includes the three first and second bobbins 30, 40 which are arranged adjoining to one another in the circumferential direction and are formed integrally with one another into one unit, there is no need to provide the first sealing member 70 at the inner peripheral side end portions 34, 43 of the first and second bobbins 30, 40 positioned at the center and the inner peripheral side end portion 34, 43 of each of the first and second bobbins 30, 40 positioned adjoining to the first and second bobbins 30, 40 positioned at the center. This allows the increased flow path of the cooling medium, thereby enhancing the cooling performance. In addition, the amount of the first sealing member 70 used is reduced to one third of the amount of the first sealing member 70 that would be used in a case each inner peripheral side end portion 34, 43 of the three first and second bobbins 30, 40 is sealed by means of the first sealing member 70. In addition, because the three first bobbins 30, 40 are formed to be integrated into one unit, the number of parts and components of the stator 1 is reduced. By reducing the number of the parts and the components, the reliability is enhanced and the costs are reduced.

According to the embodiments, the three-phase rotary electrical machine further includes the first sealing member 70 arranged at each of the inner peripheral side end portions 34, 43 of the bobbin unit 50, 60 configured as the one unit.

According to the above described structure, it is restricted that the cooling medium, which removes the heat from the winding, flows out to the rotor side. Accordingly, the heat transfer via the cooling medium to the rotor and the friction loss occurring at the rotor are reduced.

According to the embodiments, the three-phase rotary electrical machine further includes the motor cover 4 for pressure-pumping the cooling medium to the cooling passage 71, the motor cover 4 covering one end of the three-phase electrical machine in the axial direction.

According to the above described structure, one end of the three-phase electrical machine in the axial direction is covered with the motor cover 4, and the cooling medium may be pressure-pumped to the cooling passage 71 via the motor cover 4. Accordingly, there is no need to separately provide a supply passage for supplying the cooling medium, which reduces man-hours and a size of the three-phase rotary electrical machine.

According to the embodiments, the motor cover 4 includes the opening portion 402 facing the cooling passage 71 and configured to discharge the cooling medium to the cooling passage 71, and the projection portion projecting in a direction of the stator core 10 and engaging with the inner peripheral flange portion 32 and the outer peripheral flange portion 33 of the first and second bobbins 30, 40.

According to the above described structure, the motor cover 4 includes the projection portion which engages with the inner peripheral flange portion 32 and the outer peripheral flange portion 33 of the first and second bobbins 30, 40. Accordingly, it is restricted that the cooling medium discharged from the opening portion 402 of the motor cover 4 flows toward the rotor 2 and/or toward the stator housing 100 by bringing the first and second bobbins 30, 40 and the motor cover 4 in contact with each other at the projection portion.

According to the embodiments, the opening portion 402 is provided with the pipe 400 arranged for introducing the cooling medium.

According to the above described structure, the pipe 400 introducing the cooling medium is provided at the opening portion 402 of the motor cover 4. Accordingly, the cooling medium is pressure-pumped via the pipe 400 provided at the motor cover 4 to the cooling passage 71.

According to the embodiments, the three-phase rotary electrical machine further includes the o-ring 8 provided each of between the projection portion of the motor cover 4 and the inner peripheral flange portion 32 of the first and second bobbins 30, 40, and between the projection portion and the outer peripheral flange portion 33 of the first and second bobbins 30, 40.

According to the above described structure, the o-ring 8 is provided each of between the projection portion of the motor cover 4 and the inner peripheral flange portion 32 of the first and second bobbins 30, 40, and between the projection portion and the outer peripheral flange portion 33 of the first and second bobbins 30, 40. Accordingly, a sealing performance at an engaging portion between each of the first and second bobbins 30, 40 and the motor cover 4 is enhanced, and thus an effect of restricting outflow of the cooling medium is enhanced.

According to the embodiments, the correlation distance G1, G2 between the windings 20 at the cooling passage 71 becomes gradually shorter from the supply side D1 toward the discharge side D2 of the cooling medium supplied to the cooling passage 71.

It is generally known that "an amount of heat removed is proportional to a heat transfer area and to a temperature difference, and is (theoretically) proportional to square root of a flow rate". At the supply side D1 of the cooling medium, the difference between the temperature of the windings 20, 20 and the temperature of the cooling medium is larger, and thus the cooling efficiency is higher compared to the discharge side D2 of the cooling medium. Thus, even in a case where the flow rate of the cooling medium is set to be lower at the supply side D1 than that at the discharge side D2, the sufficient amount of heat is removed. On the other hand, at the discharge side D2 of the cooling medium, the temperature of the cooling medium rises as the cooling medium removes the heat from the windings 20, 20, and thus the difference between the temperature of the windings 20, 20 and the temperature of the cooling medium becomes smaller, which decreases the cooling efficiency. Therefore, the flow rate of the cooling medium is set higher at the discharge side (the side indicated with the direction of the arrow D2) than at the supply side (the side indicated with the direction of the arrow D1) in order to assure the necessary amount of heat removed.

According to the above described structure, the correlation distance G1, G2 between the windings 20, 20 at the cooling passage 71 is set to be gradually shorter from the supply side D1 toward the discharge side D2 of the cooling medium supplied to the cooling passage 71, which therefore allows the flow rate of the cooling medium at the discharge side D2 to be set higher than that at the supply side D1. Consequently, the flow rate of the cooling medium may be set to become gradually higher from the supply side D1 toward the discharge side D2 of the cooling medium, and thus the amount of the heat removed from the windings 20, 20 is equalized.

According to the embodiments, the manufacturing method of the three-phase rotary electrical machine, the three-phase rotary electrical machine includes the stator 1 including the stator core 10 including the split cores 11 split in the circumferential direction of the rotation axis X, the rotor 2 arranged coaxially with and facing the stator 1, the first and second bobbins 30, 40 made of the insulating material and attached to each of the split cores 11, the winding 20 being wound in the concentrated winding method around each split core 11 to which the first and second bobbins 30, 40 are attached, the first and second bobbin units 50, 60 including three of the first and second bobbins 30, 40 which are arranged in the circumferential direction as one unit, wherein each of the first and second bobbins 30, 40 includes the inner peripheral side end portions 34, 43, the inner peripheral side end portions 34, 43 of the first and second bobbins 30, 40 positioned at the center among the three first and second bobbins 30, 40 of the first and second bobbin unit 50, 60 are formed in the bendable manner integrally with the corresponding inner peripheral side portion 34, 43 of each of the first and second bobbins 30, 40 positioned adjoining to the first and second bobbins 30, 40 positioned at the center, and the first and second bobbin units 50, 60 are respectively split in the axial direction of the rotation axis X in such a way that the first and second bobbin unit 50, 60 are configured to be attached to three of the split cores 11 from the axial ends of the three split cores 11, the manufacturing method of the three-phase rotary electrical machine includes the assembly process for attaching the first and second bobbin units 50, 60 to the three of the split cores 11 from the axial ends of the split core 11, the winding process for arranging the inner peripheral side surfaces 321 of the first and second bobbin unit 50, 60, which is attached to the three of the split cores 11, in the triangular configuration when viewed in the axial direction and for winding the winding 20, and the sealing process for arranging the first and second bobbin unit 50, 60, around which the winding 20 is wound, along the circumferential direction and for sealing the first and second bobbin units 50, 60 and the first and second bobbin unit 50, 60 positioned adjoining thereto with each other at the inner peripheral side end portions 34, 43.

According to the above described structure, because the winding is performed in the state where the inner peripheral side surfaces of each of the first and second bobbin units 50, 60 attached to the three split cores 11 are arranged to define the triangular configuration when viewed in the axial direction, while the winding is being performed on one of the three phases, it is restricted that the bobbins for other phases interfere with the bobbin for the phase on which the winding is being performed, and thus the operation efficiency is enhanced. In addition, by performing the winding in the state where the triangular configuration is defined, the windings 20 for two or three phases may be wound at the same time.

According to the embodiments, the manufacturing method of the three-phase rotary electrical machine, the three-phase rotary electrical machine including the stator 1 including the stator core 10 including the split cores 11 split in the circumferential direction of the rotation axis X, the rotor 2 arranged coaxially with and facing the stator 1, the first and second bobbins 30, 40 made of the insulating material and attached to each of the split cores 11, the winding 20 being wound in the concentrated winding method around each split core 11 to which the first and second bobbins 30, 40 are attached, the first and second bobbin units 50, 60 including three of the first and second bobbins 30, 40 which are arranged in the circumferential direction as one unit, wherein each of the first and second bobbins 30, 40 includes the inner peripheral side end portions 34, 43, each inner peripheral side end portion 34, 43 of each of the first and second bobbins 30, 40 is formed in the bendable manner integrally with the corresponding inner peripheral side portion 34, 43 of the adjoining first and second bobbins 30, 40, the inner peripheral side surfaces 321 define the triangular configuration when viewed in the axial direction of the rotation axis X, and the first and second bobbin units 50, 60 are respectively split in the axial direction in such a way that the first and second bobbin unit 50, 60 are configured to be attached to the three of the split cores 11 from the axial ends of the three split cores 11, the manufacturing method of the three-phase rotary electrical machine including the assembly process for attaching the first and second bobbin units 50, 60 to the three of the split cores 11 from the axial ends of the split core 11, the winding process for winding the winding 20 around the first and second bobbin units 50, 60 which is attached to the split cores 11, the cutting process for cutting one of the apices of the triangular configuration after the winding 20 is wound, and the sealing process for arranging the first and second bobbin units 50, 60, where the one of the apices of the triangular configuration is cut, along the circumferential direction and for sealing the first and second bobbin units 50, 60 and the first and second bobbin units 50, 60 positioned adjoining thereto with each other at the inner peripheral side end portions 34, 43.

According to the above described structure, the winding 20 is wound around the first and second bobbin units 50, 60 each of which is constituted by three of the first and second bobbins 30, 40 arranged in the circumferential direction as one unit. The winding is performed by using the first and second bobbin units 50, 60 where each inner peripheral side end portion 34, 43 of each of the first and second bobbins 30, 40 is formed in the bendable manner integrally with the corresponding inner peripheral side portion 34, 43 of the adjoining first and second bobbins 30, 40, and the inner peripheral side surfaces of the first and second bobbin units 50, 60 are arranged to define the triangular configuration when viewed in the axial direction. One of the apices of the triangular configuration is cut out after completion of the winding, and therefore there is no need to bring the inner peripheral side end portions 34, 43 of the circumferential ends of the first and second bobbin units 50, 60 to be in contact with each other in order to form the triangular configuration before performing the winding, and thus the operation efficiency is enhanced. In addition, the split cores 11 and the first and second bobbin units 50, 60 are easily assembled to each other.

According to the embodiments, the three-phase rotary electrical machine includes the stator 1 including the stator core 10 including the split cores 11 split in the circumferential direction of the rotation axis X, the rotor 2 arranged coaxially with and facing the stator 1, and the first and second bobbins 30, 40 made of the insulating material and attached to each of the split cores 11, the winding 20 being wound in the concentrated winding method around each split core 11 to which the first and second bobbins 30, 40 are attached, the winding 20 being provided for each of the three phases of the rotary electrical machine, wherein each of the first and second bobbins 30, 40 includes the inner peripheral side end portions 34, 43, the first and second bobbins 30, 40 attached to one of the split cores 11 and the first and second bobbins 30, 40 attached to another one of the split cores 11 positioned adjoining to the one of the split cores 11 are sealed with each other at the corresponding inner peripheral side end portions 34, 43, and the cooling passage 71 extending in the axial direction of the rotation axis X is provided at each clearance between the windings 20 for the three phases.

According to the above described structure, the first and second bobbins 30, 40 attached to one of the split cores 11 and the first and second bobbins 30, 40 attached to another one of the split cores 11 positioned adjoining to the one of the split cores 11 are sealed with each other at the corresponding inner peripheral side end portions 34, 43, and the cooling passage 71 extending in the axial direction is provided at each clearance between the three-phase windings 20, 20. Accordingly, the cooling medium is allowed to flow between the three-phase windings 20, 20, and thus each winding 20, which releases the highest amount of heat among parts and components of the stator 1, is directly cooled. In addition, the first and second bobbins 30, 40 and the first and second bobbins 30, 40 positioned adjoining thereto are sealed with each other at the inner peripheral side end portions 34, 34, and therefore it is restricted that the cooling medium which removes the heat from the winding 20 flows out to the rotor side. Accordingly, the heat transfer via the cooling medium to the rotor 2 and the friction loss occurring at the rotor 2 are reduced.

According to the embodiments, the three-phase rotary electrical machine further includes the first sealing member 70 arranged at each of the inner peripheral side end portions 34, 43 of the first and second bobbins 30, 40 attached to one of the split cores 11 and the first and second bobbins 30, 40 attached to another one of the split cores 11 positioned adjoining to the one of the split cores 11.

According to the above described structure, it is restricted that the cooling medium, which removes the heat from the winding, flows out to the rotor side. Accordingly, the heat transfer via the cooling medium to the rotor and the friction loss occurring at the rotor are reduced.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A three-phase rotary electrical machine, comprising:
a stator including a stator core including split cores split in a circumferential direction of a rotation axis;
a rotor arranged coaxially with and facing the stator;
a bobbin made of an insulating material and attached to each of the split cores, a winding being wound in a concentrated winding method around each split core to which the bobbin is attached, the winding being provided for each of three phases of the rotary electrical machine; and
a bobbin unit including three of the bobbins which are arranged in the circumferential direction as one unit, wherein
each bobbin includes inner peripheral side end portions, the inner peripheral side end portions of the bobbin positioned at a center among the three bobbins of the bobbin unit are formed in a bendable manner integrally with the corresponding inner peripheral side portion of each of the bobbins positioned adjoining to the bobbin positioned at the center, the bobbin unit is split in an axial direction of the rotation axis in such a way that the bobbin unit is configured to be attached to three of the split cores from axial ends of the three split cores,
the three of the split cores are attached with the bobbin unit from the axial ends, the bobbin unit is sealed at the corresponding inner peripheral side end portions with the bobbin unit positioned adjoining thereto, and
a cooling passage extending in the axial direction is provided at each clearance between the windings for the three phases.

2. The three-phase rotary electrical machine according to claim 1, further comprising:
a first sealing member arranged at each of the inner peripheral side end portions of the bobbin unit configured as the one unit.

3. The three-phase rotary electrical machine according to claim 1, further comprising:
a cooling medium supply cover for pressure-pumping a cooling medium to the cooling passage, the cooling medium supply cover covering one end of the three-phase electrical machine in the axial direction.

4. The three-phase rotary electrical machine according to claim 3, wherein the cooling medium supply cover includes an opening portion facing the cooling passage and configured to discharge the cooling medium to the cooling passage, and a projection portion projecting in a direction of the stator core and engaging with an inner peripheral flange portion and an outer peripheral flange portion of the bobbin.

5. The three-phase rotary electrical machine according to claim 4, wherein the opening portion is provided with a pipe arranged for introducing the cooling medium.

6. The three-phase rotary electrical machine according to claim 4, further comprising:
a second sealing member provided each of between the projection portion of the cooling medium supply cover and the inner peripheral flange portion of the bobbin, and between the projection portion and the outer peripheral flange portion of the bobbin.

7. The three-phase rotary electrical machine according to claim 1, wherein a correlation distance between the windings at the cooling passage becomes gradually shorter from a supply side toward a discharge side of the cooling medium supplied to the cooling passage.

8. A manufacturing method of a three-phase rotary electrical machine, the three-phase rotary electrical machine comprising a stator including a stator core including split cores split in a circumferential direction of a rotation axis, a rotor arranged coaxially with and facing the stator, a bobbin made of an insulating material and attached to each of the split cores, a winding being wound in a concentrated winding method around each split core to which the bobbin is attached, a bobbin unit including three of the bobbin which are arranged in the circumferential direction as one unit, wherein each bobbin includes inner peripheral side end portions, the inner peripheral side end portions of the bobbin positioned at a center among the three bobbins of the bobbin unit are formed in a bendable manner integrally with the corresponding inner peripheral side portion of each of the bobbins positioned adjoining to the bobbin positioned at the center, and the bobbin unit is split in an axial direction of the rotation axis in such a way that the bobbin unit is configured to be attached to three of the split cores from axial ends of the three split cores, the manufacturing method of the three-phase rotary electrical machine comprising:
    an assembly process for attaching the bobbin unit to the three of the split cores from the axial ends of the split core;
    a winding process for arranging inner peripheral side surfaces of the bobbin unit, which is attached to the three of the split cores, in a triangular configuration when viewed in the axial direction and for winding the winding; and
    a sealing process for arranging the bobbin unit, around which the winding is wound, along the circumferential direction, and for sealing the bobbin unit and the bobbin unit positioned adjoining thereto with each other at the inner peripheral side end portions.

9. A manufacturing method of a three-phase rotary electrical machine, the three-phase rotary electrical machine comprising a stator including a stator core including split cores split in a circumferential direction of a rotation axis, a rotor arranged coaxially with and facing the stator, a bobbin made of an insulating material and attached to each of the split cores, a winding being wound in a concentrated winding method around each split core to which the bobbin is attached, a bobbin unit including three of the bobbin which are arranged in the circumferential direction as one unit, wherein each bobbin includes inner peripheral side end portions, each inner peripheral side end portion of each bobbin is formed in a bendable manner integrally with the corresponding inner peripheral side portion of the adjoining bobbins, inner peripheral side surfaces define a triangular configuration when viewed in an axial direction of the rotation axis, and the bobbin unit is split in the axial direction in such a way that the bobbin unit is configured to be attached to three of the split cores from axial ends of the three split cores, the manufacturing method of the three-phase rotary electrical machine comprising:
    an assembly process for attaching the bobbin unit to the three of the split cores from axial ends of the split core;
    a winding process for winding the winding around the bobbin unit which is attached to the split cores;
    a cutting process for cutting one of apices of the triangular configuration after the winding is wound; and
    a sealing process for arranging the bobbin unit, where the one of the apices of the triangular configuration is cut, along the circumferential direction and for sealing the bobbin unit and the bobbin unit positioned adjoining thereto with each other at the inner peripheral side end portions.

10. A three-phase rotary electrical machine, comprising:
    a stator including a stator core including split cores split in a circumferential direction of a rotation axis;
    a rotor arranged coaxially with and facing the stator; and
    a bobbin made of an insulating material and attached to each of the split cores, a winding being wound in a concentrated winding method around each split core to which the bobbin is attached, the winding being provided for each of three phases of the rotary electrical machine, wherein
    each bobbin includes inner peripheral side end portions, the bobbin attached to one of the split cores and the bobbin attached to another one of the split cores positioned adjoining to the one of the split cores are sealed with each other at the corresponding inner peripheral side end portions, and
    a cooling passage extending in an axial direction of the rotation axis is provided at each clearance between the windings for the three phases.

11. The three-phase rotary electrical machine according to claim 10, further comprising:
    a first sealing member arranged at each of the inner peripheral side end portions of the bobbin attached to the one of the split cores and the bobbin attached to the another one of the split cores positioned adjoining to the one of the split cores.

* * * * *